Sept. 24, 1963  R. B. WHITE ETAL  3,105,201
AMPLIFYING, IMPEDANCE CHANGING OR LEVEL CHANGING APPARATUS
Filed Sept. 30, 1959

United States Patent Office 3,105,201
Patented Sept. 24, 1963

3,105,201
AMPLIFYING, IMPEDANCE CHANGING OR
LEVEL CHANGING APPARATUS
Robert Benjamin White, 323 Glebe Road, Glebe Point,
New South Wales, and Cyril Thomas Murray, 10
Hockley Road, Eastwood, New South Wales, Australia
Filed Sept. 30, 1959, Ser. No. 843,471
Claims priority, application Australia Oct. 1, 1958
3 Claims. (Cl. 330—71)

The invention relates to an amplifying, impedance changing or level changing apparatus and has for its object the provision of an improved apparatus which may be used in radio, electrical, hydraulic or mechanical forms.

The object of the invention is to provide apparatus of the kind set forth in which a very low degree of distortion is present in the output when compared with the input.

The invention consists in an amplifying, impedance changing or level changing apparatus, consisting of a first and a second amplifying device, the outputs of which are combined so that the combined output is the sum or difference of the individual outputs of said devices, one of said amplifying devices being excited or fed by an input signal, a comparator device to which is fed the input signal or a part thereof and also the combined output or a part thereof, the comparator being such as to produce an output proportional to the difference in magnitude, phase or other characteristic between the input or a part thereof and the combined output or a part thereof, the output from the comparator being fed to the input of the second amplifying device.

Figure 1:
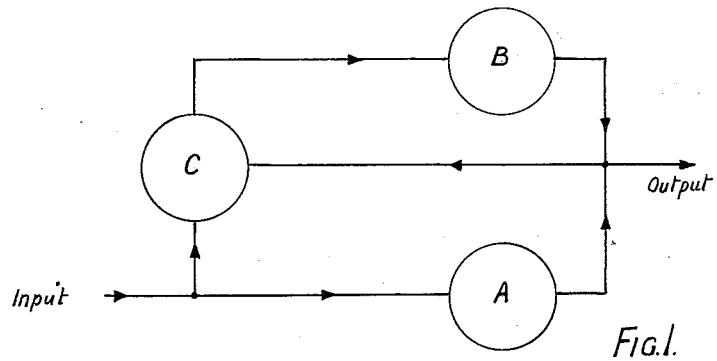
Figure 2:
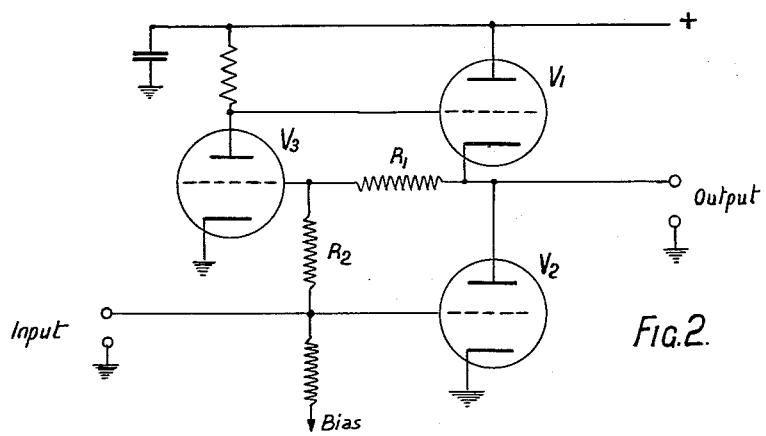
Figure 3:
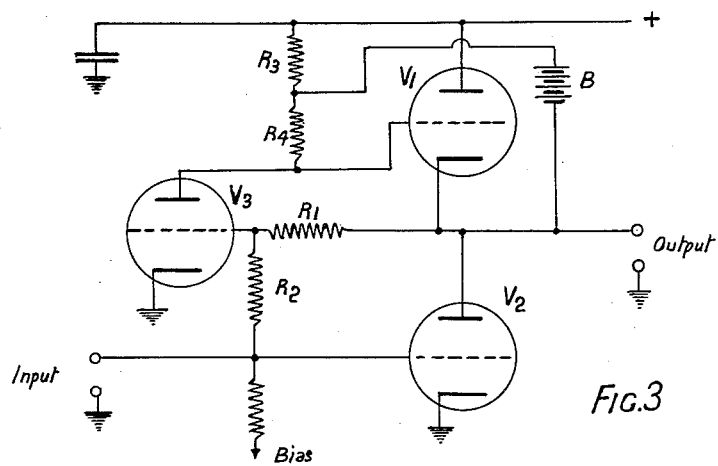

In order that the invention may be better understood, preferred forms thereof are illustrated, by way of example, in the accompanying drawing in which FIG. 1 is a block diagram illustrative of the principle employed, FIG. 2 is a circuit diagram of an audio-frequency amplifier according to the invention, and FIG. 3 is a circuit diagram of a slightly modified form of audio-frequency amplifier.

In FIG. 1, A indicates an amplifying device which may be electrical, mechanical or hydraulic. B is second amplifying device, and C is a comparator by means of which the amplitude, phase or other characteristic of an input fed to A may be compared with the combined output of A and B. From the circuit diagram it will be seen that the input is fed both to the amplifying device A and to the comparator C. The output from the comparator C is fed to the amplifying device B and the combined outputs of A and B, representing the sum or difference of their individual outputs, are fed into the comparator C.

The output from C represents the error or difference in the combined output as compared with the input. In operation this arrangement maintains the outputs of A and B complementary so that distortion in the combined output is maintained at a very low level, that it to say that the characteristics of the output reproduce very closely those of the input, although the actual magnitude may be considerably different.

It will be appreciated that the comparator C may include amplifying means itself and that only a specific proportion and not the whole of the input need be fed to the comparator. In electrical applications the comparator may be formed by a network of passive elements to provide any desired characteristics. For example capacitors could be connected across the resistors $R_1$ and $R_2$ shown in FIGS. 2 and 3 to equalize phase shift with frequency. Vacuum tubes, transistors or magnetic amplifiers could also be included in the comparator, many different versions of which will readily suggest themselves to those skilled in the art.

The circuit maintains the dynamic balance between A and B, thus allowing a low distortion output to be obtained up the maximum power capabilities of the amplifiers A and B. The system may be directly coupled or not depending upon the results which it is desired to achieve and in the former case the static balance between A and B is maintained, allowing rapid recovery from transient overloads.

While apparatus according to the invention is capable of being used in a wide range of applications, as will be explained in more detail below, a particularly useful application of the invention is its use in connection with audio-frequency amplifiers, in which it is desired to provide an output which is as free as possible from distortion. In FIGS. 2 and 3 are shown audio-frequency amplifiers embodying the invention. In both FIGS. $V_2$ represents the first amplifying device and $V_1$ the second amplifying device, the comparator is constituted by the resistive network $R_1$ and $R_2$. In both circuits the function of $V_3$ is simply that of an amplifier.

The mode of operation of both circuits will be readily appreciated by those skilled in the art in the light of the explanation given in respect of FIG. 1. The operation of both circuits is substantially the same, but in the circuit of FIG. 3 a somewhat higher gain is obtainable from $V_3$ due to the presence of the resistors $R_3$, $R_4$ and the battery B.

Either of the circuits shown may be used in pairs, the output in that case being taken between the output connections of each circuit. With such an arrangement the drive of both circuits can be arranged so that the D.C. level of each is maintained within a very close approximation to that of the other. This avoids using isolating capacitors and is particularly useful for transistor and magnetic amplifier circuits, which devices may readily be used in a device constructed according to the invention.

When used as an audio-amplifier, apparatus according to the invention has inherent low distortion, small phase shift and low output impedance without the use of large amounts of feedback and produces results far exceeding those produced by any comparable system that has beeen tried.

The invention may also be used in recording systems in which the recording transducer may be used to provide the output to feed the comparator. This enables the recording to be compensated for inherent distortion in the recording transducer. In this application the invention also possesses several advantages as when used as an audio-amplifier.

The invention may also be applied to video amplifiers, the construction in which case would follow that for audio-amplifiers with suitable changes in construction and component values to deal with the extended frequency range. The advantages of the invention in this application are exhibited in better transient response and less delay.

The invention may also be embodied in an amplifier for the construction of instruments such as oscillators, signal generators and distortion measuring equipment, having very low distortion and a wide frequency response.

Finally the invention may be utilised in a mechanical or hydraulic form by substituting completely or in part mechanical or hydraulic amplifiers and in such forms the invention would enable great positional accuracy to be obtained in the output and such an amplifier would be self-compensating for loading.

It will be evident from the description set out above that the principles of the invention as defined broadly have a wide applicability and it is emphasised the embodiments of the invention described above are given

What we claim is:

1. An amplifying impedance changing and level changing apparatus, comprising a first amplifying device and a second amplifying device, each of said amplifying devices having an input side, said amplifying devices being connected as a series energized pair having a junction therebetween whereat appears a combined output selectively representing the sum and difference of the outputs of the amplifying devices, means for connecting to the input side of said first amplifying device an input signal, a comparator device having two inputs and an output side, amplifying means connecting the output side of said comparator device to the input side of said second amplifying device, connecting means connecting said junction to one of the inputs of said comparator device, and means for feeding at least a portion of said input signal to the other input of said comparator device, the comparator device including means to produce at the output side of the comparator device an output proportional to a selected characteristic difference between the portion of the input signal and the portion of the said combined output which is fed to said one input of the comparator.

2. An apparatus as claimed in claim 1 wherein said first and second amplifying devices are thermionic valves.

3. An apparatus as claimed in claim 2 wherein the comparator consists of a network of electrically passive elements.

References Cited in the file of this patent

UNITED STATES PATENTS

| | | |
|---|---|---|
| 2,658,117 | Sunstein et al. | Nov. 3, 1953 |
| 2,737,547 | Deming | Mar. 6, 1956 |
| 2,795,653 | McCoy | June 11, 1957 |
| 2,866,018 | Bell | Dec. 23, 1958 |